Aug. 2, 1960   H. MÜLLER   2,947,885
ELECTRICAL FENCING EQUIPMENT
Filed Dec. 18, 1958   3 Sheets-Sheet 1

INVENTOR.
Heinz Müller
BY Richards & Geier
ATTORNEYS

Aug. 2, 1960 H. MÜLLER 2,947,885
ELECTRICAL FENCING EQUIPMENT
Filed Dec. 18, 1958 3 Sheets-Sheet 2

INVENTOR.
Heinz Müller
BY Richards & Geier
ATTORNEYS

Aug. 2, 1960　　　　H. MÜLLER　　　　2,947,885
ELECTRICAL FENCING EQUIPMENT
Filed Dec. 18, 1958　　　　　　　　　　3 Sheets-Sheet 3
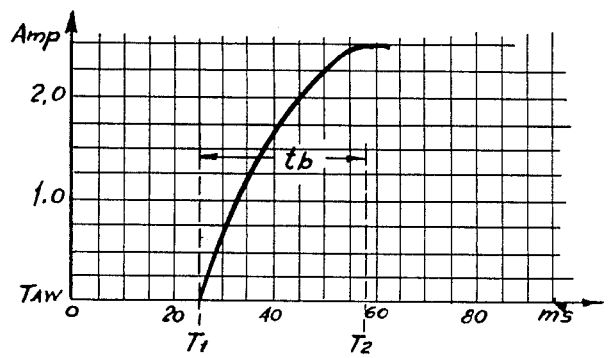
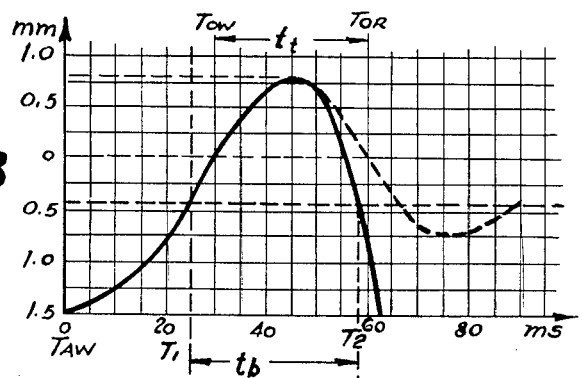
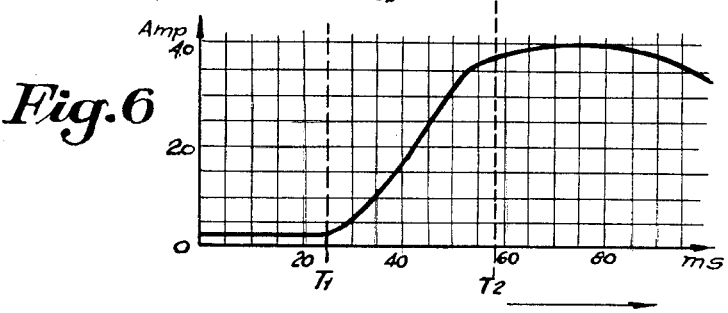
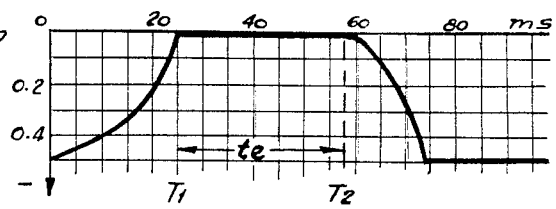
INVENTOR.
Heinz Müller
BY Richards y Geier
ATTORNEYS

United States Patent Office 2,947,885
Patented Aug. 2, 1960

2,947,885

ELECTRICAL FENCING EQUIPMENT

Heinz Müller, Langemarckweg 21, Korbach-Waldeck, Germany

Filed Dec. 18, 1958, Ser. No. 781,382

Claims priority, application Germany Sept. 6, 1955

12 Claims. (Cl. 307—132)

This invention relates to an electrical equipment for applying electrical impulses to a fence at regular time intervals. The invention is particularly concerned with a special relay for an electrical equipment for a fence which is included in a circuit containing a high voltage transformer and a condenser and preferably operating with batteries.

In prior art relays used in conjunction with the electrical charging fence equipment found little use, although such relays are comparatively simple in construction. This is particularly true as far as electrical fence equipment is concerned which is actuated by batteries. Prior art equipment operating with batteries uses predominently a mechanical pendulum for periodically switching on and off a high voltage transformer at a frequency at about one second.

This is based on the fact that a device using a mechanical pendulum can better withstand the high requirements made for interrupter contacts than the prior art relay contacts, so that when the latter are used the proper operation of the equipment is often detrimentally affected. On the other hand, proper operational safety is particularly important for devices supplying electrical impulses to fences, since such devices in actual use must operate practically without supervision. The breakdown of a device of this nature will interrupt the flow of electrical current to the fence, so that the fence is not protected any more. Cattle can then easily break through the fence and create substantial damage in the adjacent area. Thus, an electrically operated fence, the operational security of which cannot be assured, is not acceptable.

The requirements placed upon the frequency of operations of the interrupter contacts are exceptionally high. When a fence is subject to electrical impulses day and night for a period of six months, and a high voltage impulse is supplied to the fence every second, approximately $1.6 \times 10^7$ switching operations must be carried out yearly. Furthermore, the exceptionally high requirements placed upon interrupter contacts refer not only to the great frequency of operations but also to high load upon the contacts. This is particularly true as far as equipment provided with batteries is concerned. When such equipment is used the interrupter contact must switch off from 6 to 9 volts direct current having from 2 to 5 amperes which results in a substantial contact creep. This is still further affected detrimentally in that the contacts must switch on and off the primary winding of a high voltage transformer which is an inductance, so that during the switching off comparatively high induction voltages occur at the contacts.

When interrupter contacts are used which are operated by a mechanical pendulum, it is possible to use contacts capable of sustaining comparatively large pressures and large extent of movements, as compared to relay contacts. Changes in the form of contacts resulting from contact creep produce less failures in a device operated by pendulum than in a device operated by a relay, wherein changes in the form of contacts result in the short circuiting of the contacts.

However, the security of operations of a pendulum-operated device is detrimentally affected by bearing friction of a mechanical pendulum and other reasons, so that there is a necessity for a relay which would eliminate the above-mentioned drawbacks.

Consequently, an object of the present invention is the provision of a relay which is specifically intended and suitable for use in connection with an electrically charged fence, which does not have the above-mentioned drawbacks and which is not affected by errors arising due to friction in a round relay.

Other objects of the present invention will become apparent in the course of the following specification.

In accomplishing the objects of the present invention it was found desirable to provide an electrical equipment comprising a relay magnet with an iron core, one or more relay windings, an armature, a contact spring and a counterspring, whereby the charging and discharging of a condenser determines a switching frequency of the range of about one second for a very large number of current impulses of the secondary winding of the transformer upon the fence, and/or the discharge of the condenser takes place through the primary winding of the transformer during a presetting time period ($t_b$) during which the contacts are in engagement, while the opening produces a voltage in the secondary winding corresponding to that required for the impulses only after this time period ($t_b$), which amounts to about 20 to 40 milliseconds, for example, and is thus quite small in comparison to the above switching period.

This time period during which the contacts are in engagement begins when the two contacts engage each other in the so-called normal position of the counterspring and ends in the moment in which the magnetic force of the charging current of the condenser which attracts the relay armature, is greater than the resilient and mass forces of the contact springs which hold the two contacts together.

The above-mentioned pair of contacts of this relay arrangement is a rest contact which discharges the condenser through the primary winding of the high voltage transformer. The charging current of the condenser attracts the relay armature and opens the rest contact until the charging current becomes so small that the armature falls off. This results in the closing of the rest contact and in the above-described discharge of the condenser through the primary winding. The condenser and the relay winding are so adjusted that this procedure takes place in the above-described periodic switching frequency of about one second, or a frequency of similar duration.

According to the invention, a leaf spring carries the armature and is resiliently swingable in relation to its mounting; when at rest with the relay deenergized, this spring is located in an intermediate position in which the armature is spaced from the core. A second spring carries one of the two contacts and swings to and from a normal position in which the two contacts are closed and in which the leaf spring is located in the above-mentioned intermediate position. The operation is such that the armature is attracted by the core to separate the contacts, when the relay winding is energized by the charging current of the condenser, and thereupon swings away from the core to cause the contacts to close during a predetermined time period and to produce a discharging current of the condenser in the primary winding. The duration of the swinging of the contact carrying spring is so related to the time period during which the contacts are closed, that the armature swings without stopping to its position of outermost deflection from the core, and immediately thereafter back only in the direction of attraction of the core and after the separation of contacts aperiodically and with acceleration. Only after separation of the contacts one of the electrical impulses is produced by induction of a field in the secondary winding at the end of the above-mentioned time period close to the intermediate position of the leaf spring.

According to an embodiment of the present invention, the contact spring as well as the countersprings consist in leaf springs which are supported at one side independently of each other and which extend from the common supporting location parallel to each other and have a short distance one from the other up to a location approximately in the middle of the armature, at which the contact spring located closest to the relay core carries a contact upon that side thereof which is directed away from the core, and whereby the counterspring carries upon the side directed toward the first-mentioned spring another contact of the rest contact which is closed during the contact engagement period ($t_b$).

Furthermore, according to an embodiment of the invention, a spring carrying the armature can be provided with an extension located at the free end thereof and carrying a contact.

According to the present invention the counter-spring has the object to work elastically against the swinging of the contact spring located closer to the relay core away from this core during the contact engagement period ($t_b$), whereby not only this contact spring but also the counterspring swing freely, i.e. without engagement, and in unison.

In accordance with the present invention, the speed of the armature during its return swinging—starting from the point of the outermost location of the contact spring—at no time will amount to zero, but along with the speed of the contact located closer to the relay core, will attain a substantial value at the time of the separation of the contacts, whereby the speed of the armature will become zero only when it strikes the relay core. This has the advantages of a quick separation of the contacts, and a great drop in the so-called contact creep and in the deterioration of the contacts.

According to another embodiment of the present invention, the counterspring does not constitute a spring which is swingably mounted independently of the spring carrying the armature, but is firmly connected with a contact carrying counterspring at a location spaced from the supported end thereof, whereby the counterspring carries upon its side directed away from the relay core one contact of the pair constituting the rest contact, while the other contact is firmly fixed. According to this embodiment, as well as according to the previously described embodiment, the counter-spring is taken along with the contact spring when the latter moves away from the relay core; however, this joint movement begins already at the time when the contact spring starts its movement, and in this embodiment the interengagement of the contacts takes place after a certain path of joint movement. From the moment when the contact engagement takes place between the counterspring and the immovable counter-contact, the counterspring opposes further swinging of the contact spring as a resilient energy storer in the same manner as in the earlier described embodiment. Obviously, the distance of the contact spring from the counterspring above the relay core must be so selected in the position of rest, or zero position of the springs, namely, when they are not subject to any magnetic force, that the two springs at no time period of their movement engage each other along a line perpendicular to the line of contact of the two contacts above the relay core, or that they should not engage each other in such manner that one spring will form a stop for the other spring during the swinging taking place during the contact engagement period, so that this swinging can take place freely during this time period. Furthermore, obviously the two springs must be correctly adjusted in relation to the immovable counter-contact. As is the case in the previously described embodiment, the resilient properties of the two springs and of the armature mass are so adjusted in relation to the electrical fence equipment that the prescribed contact engagement period ($t_b$) for this equipment is provided, and that there is produced a practically harmonical return movement of the contact spring from the point of its outermost deflection to the point of the separation of the contacts toward the relay core in the form of a single oscillation quarter, whereby the half natural frequency duration of the swing system is preferably made approximately equal to the contact engagement period ($t_b$).

An advantage of the two last mentioned embodiments is that it creates additional possibilities to provide the desired setting of the swinging system. A further advantage is that the contacts are in engagement with each other at a location which is further removed from the spring support than the middle of the armature, so that the speed with which the contacts are separated can be increased in relation to the speed of the armature and proportionally thereto, depending upon the arrangement of the contacts at a greater distance from the support of the springs than that of the armature carried thereby. For that purpose, according to another embodiment of the invention, the counterspring constitutes an extension of the contact spring extending over the armature and, if desired, beyond the relay core.

All of these embodiments produce a free movement of the contact springs, which makes the relay of the present invention particularly suitable for incorporation in an electrical equipment used to supply electrical impulses to fences.

The invention will appear more clearly from the following detailed description when taken in connection with the accompanying drawings showing, by way of example, preferred embodiments of the inventive idea.

In the drawings:

Figure 5 is a diagram showing the discharge current of the condenser of an electrical fence equipment of the present invention during the contact engagement period ($t_b$), whereby this diagram is also applicable to the operation of a relay known in prior art, such as a round relay.

Figure 6 is a diagram illustrating the ampere windings of the relay windings depending upon the time, for the same time period as the diagram shown in Figure 7; this diagram is applicable to the relay of the present invention, as well as to the prior art round relay.

Figure 7 is a diagram showing the path of the armature of a prior art round relay depending upon the time of the withdrawal of the relay armature to the time when the armature is again moved in engagement with the iron core of the relay.

Figure 8 corresponds to Figure 7 and is a diagram of the path of the armature depending upon the time, of a special relay in accordance with the present invention for the same time period as that shown in Figure 7.

Figure 9:
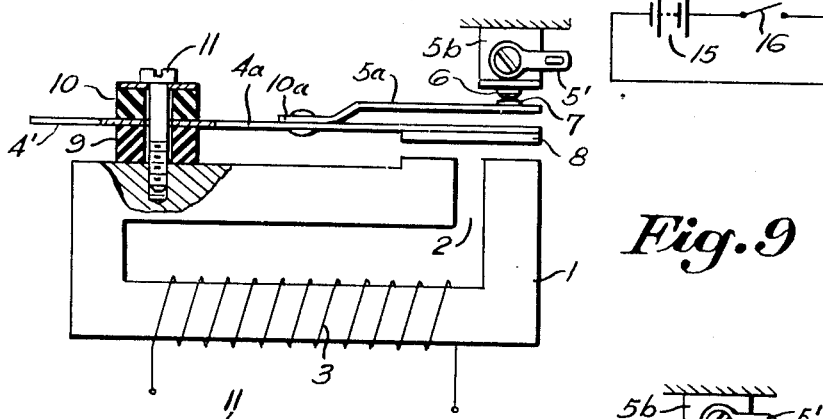
Figure 10:
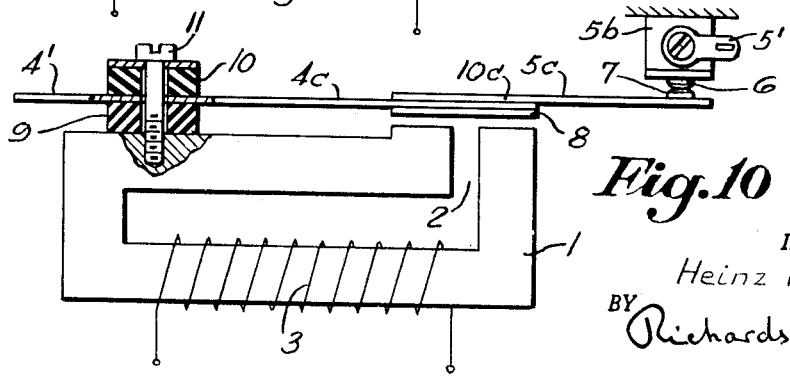

Figures 9 and 10 show two different embodiments of relays constructed in accordance with the principles of the present invention.

Figure 1:
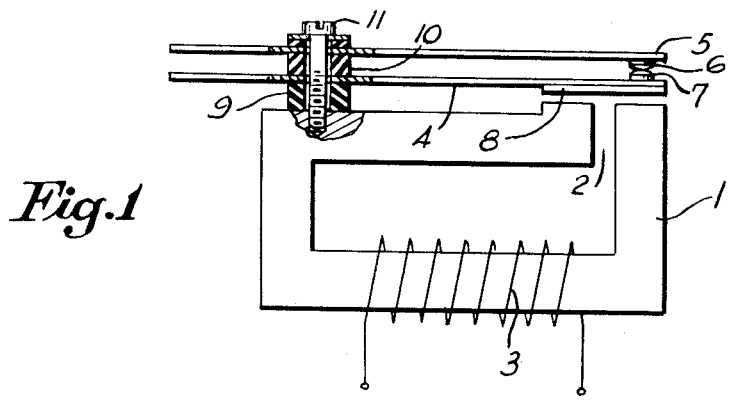
Figure 1 is a side view of a special relay in accordance with the present invention, some parts being shown in section.

The special relay shown in Figure 1 has an iron core 1 which carries a relay winding 3. The core 1 is provided with an air gap 2. Two parallel springs, namely, the contact spring 4 and the counterspring 5, are mounted at one end of the upper surface of the core 1 by means of insulating pieces 9 and 10 and a holding screw 11. It is apparent that the springs 4 and 5 extend in their position of rest above the core 1 and parallel to each other. The spring 4 carries the contact 7, while the spring 5 carries the contact 6. These two contacts are located upon opposed inner surfaces of the springs 4 and 5 and are in engagement with each other in the position of rest. The opposite outer surface of the spring 4 carries an armature 8 which is firmly connected with the spring 4, and which is located at one end of the iron core 1 opposite a pole thereof and opposite the air gap 2.

In operation, when the winding 3 is energized and the core 1 is magnetized, the armature 8 will be attracted to the core 1, so that the engagement of the contacts 6 and 7 will be interrupted and the armature 8 will engage the core 1. As soon as the magnetic force is interrupted, the armature 8 will move away from the core 1 and the contacts 6 and 7 will be brought again into engagement. The spring 4 will move still further upwardly due to its elasticity, but the counterspring 4 will resiliently oppose the continuation of this upward movement.

Figure 2:
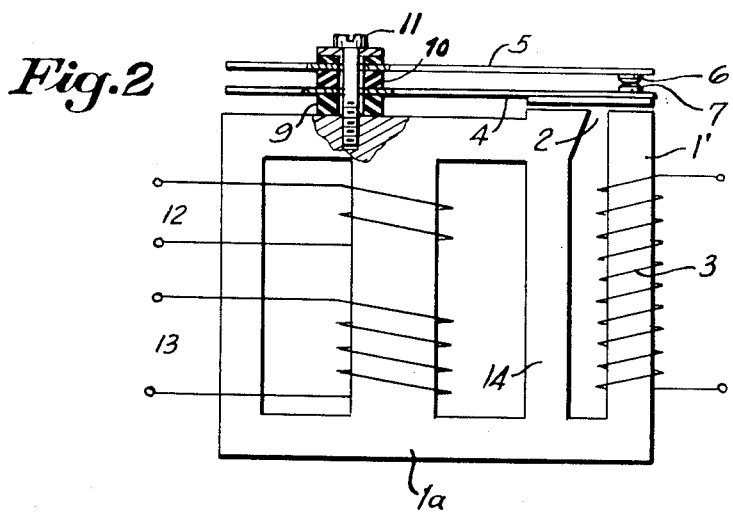
Figure 2 is a similar view of a somewhat differently constructed relay.

In the construction shown in Figure 2, wherein the same parts are designated by the same numerals, the relay winding 3 is carried upon an iron core 1', which in this construction is integral with the iron core 1a of a high voltage transformer which constitutes a part of the electrical fence equipment.

The iron core member has a piece 14 which forms a part of the magnetic circuit of the relay, as well as a part of the magnetic circuit of the transformer. This arrangement has the advantage that a substantial saving of space is attained which is most advantageous for fence equipment. The iron core 1', 1a consists as usual of a plurality of superposed transformer sheets and carries the primary winding 12 and the secondary winding 13 of the induction coil of the electrical fence equipment.

It is apparent that the iron core parts 1 and 1a can also consist of separate members, although the manufacture of a single core out of one sheet package constitutes a particularly advantageous simplification of construction, as compared to prior art round relays and flat relays wherein it is necessary to construct the core of the transformer and the core of the relay coil as separate parts.

Figure 3:
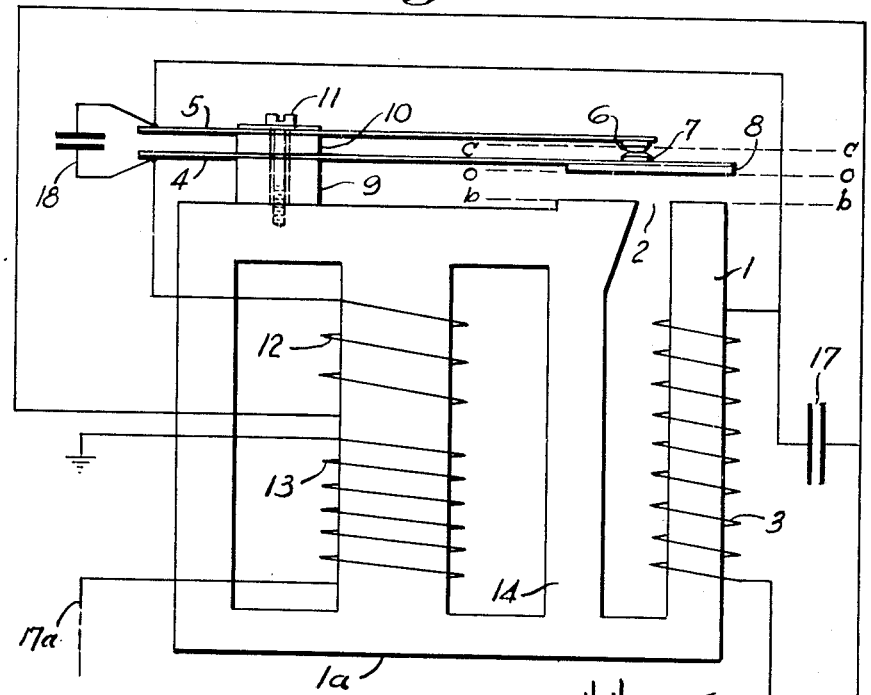
Figure 3 illustrates a relay similar to that shown in Figure 2, but provided with various diagrammatically indicated electrical devices.

Figure 3 illustrates on an enlarged scale the same construction as that shown in Figure 2, in conjunction with an electric diagram showing the manner in which the relay of the present invention is combined with the electrical fence equipment. The condenser 17 of the fence is connected at one end with an end of the relay winding 3. The opposite end of the relay winding 3 is connected with a switch 16 which is connected with one pole of the battery 15. The other pole of the battery 15 is connected to the other side of the condenser 17. The last-mentioned side of the condenser 17 is connected with one end of the primary winding 12 of the high voltage transformer, while the other end of the winding 12 is connected with the first-mentioned side of the condenser 17 through the springs 4 and 5 with the contacts 6 and 7. A condenser 18 serving as a spark extinguisher is connected in the usual manner with the springs 4 and 5. One end of the secondary winding 13 of the transformer is grounded while the other end is connected to the fence 17a.

Figure 4:
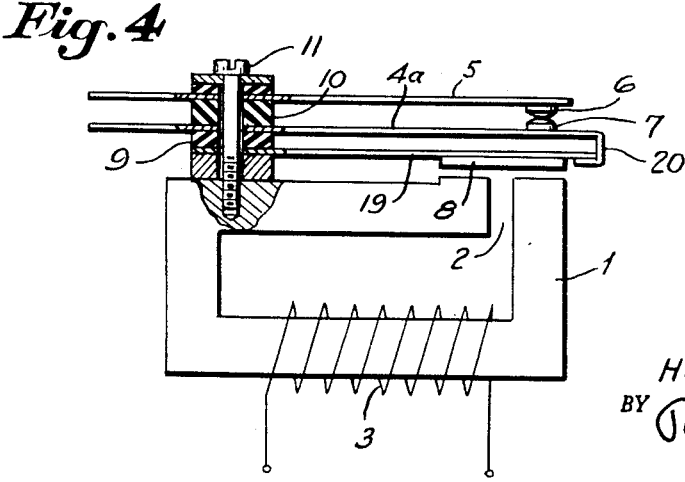
Figure 4 is a similar view illustrating a somewhat differently constructed relay.

A construction similar to that of Figure 1 is illustrated in Figure 4, the same parts being designated by the same numerals. In this construction the spring 4a, which carries the contact 7, does not carry the armature 8 which is suspended from a separate spring 19. The springs 4a and 19 are coupled by a hook 20 which constitutes a part of the spring 4a.

It is apparent that when the relay winding 3 is energized and the armature 8 is attracted by the core 1, the spring 4a will be moved toward the core 1 along with the spring 19, so that the contacts 6 and 7 will be disengaged.

The construction of the springs 4a, 5 and 19 and their size in relation to the mass of the armature 8, are so selected that the resiliency of the spring assembly consisting of the springs 4a, 5 and 19, causes the armature 8 to swing with acceleration toward the core 1, while further acceleration is imparted to the armature by the attraction of the core, whereby the speed of the armature 8 progressively increases up to and past the point of separation of the contacts 6 and 7.

The operation of the devices of the present invention is illustrated by means of diagrams shown in Figures 5 to 8. Figure 5 shows the discharge current J of the condenser 17, shown in Figure 3, which flows through the primary winding 12. The discharge current is illustrated as a function of the time depending upon the switching of the fence equipment. $T_{AW}$ designates the moment in which the relay armature 8 drops from the iron core 1. At the moment designated as $T_1$ which, by way of example, takes place 25 milliseconds after the point $T_{AW}$, begins the time period ($t_b$) during which the contacts are in engagement, and thus begins the discharge current which is indicated in amperes. This current increases comparatively slowly and, therefore, cannot produce a sudden voltage impulse in the secondary winding 13, as is required for the fence. Upon expiration of the prescribed time period of contact engagement ($t_b$), which, in the example illustrated, is assumed to be 33 milliamperes, and which is designated as the point $T_2$, the contacts 6 and 7 are to be separated from each other. This moment $T_2$ advantageously occurs shortly before the discharge current J reaches its maximum. Due to the separation of the contacts 6 and 7, the discharge current becomes zero. The magnetic energy produced by the discharge current J and collected in the iron core 1a of the transformer, produces immediately after the separation of the contacts 6 and 7, an electrical oscillation in the primary winding 12 and in the spark-eliminating condenser 18, whereby the desired high voltage impulse is produced in the secondary winding 13 and transmitted to the fence 17a.

The ordinate of Figure 6 shows the ampere windings of the relay winding 3 of Figures 1 to 4, which are produced due to the charging of the condenser 17, as a function of the time for the same time period as that of Figure 5. These ampere windings correspond to the magnetic force of attraction exerted upon the armature 8 which, obviously, is also dependent upon the distance of the armature. It should be noted that the diagram of Figure 6 is applicable to the relays of the present invention, as well as to the prior art round relay which consists of a round iron core carrying a U-shaped iron body. The drawback of such a round relay known in prior art is that when its armature is moved friction takes place at the point where the armature rotates around a cutter and also friction takes place between the armature and the insulating rod of the contact spring. Figure 7 is a diagram for such a prior art round relay, wherein the ordinate shows the path of the armature in millimeters as a function of the time for the same time period as that indicated in Figures 5 and 6. Let it be assumed that the charging current of a condenser has attracted the armature. If then the charging current drops to a value which is not sufficient any more to hold the armature in the attracted position, for example, to two ampere windings of Figure 6, then at the moment $T_{AW}$ the armature will drop off from the core. In the previous attracted position the armature, which is not connected with the contact spring in this prior art construction, was holding the contact spring at a distance from the counter-contact by means of an insulating pin. Consequently, when the armature drops off, the rest contact is closed by spring resiliency at the moment indicated as $T_1$ in Figure 7. Approximately in the moment $T_1$ at the beginning of the contact engagement, the armature of the prior art relay strikes a stop. The contact spring and the armature are at rest during a time period $t_0$ up to the time period $T_2$, whereby this time period $t_0$ for practical purposes can be assumed as being equal to the time period ($t_b$), shown in Figures 5 and 6, until in the time period $T_1$ according to Figure 6, the rising charging current of the condenser in the relay winding has increased the magnetic field to such an extent that the relay armature begins to move at the moment $T_2$, so that the rest contact is opened.

The drawback of this prior art construction consists in that at the moment $T_2$ when the contacts are separated, the contact spring begins its movement substantially with the velocity zero, so that the separation of the contacts take place on the average with a small velocity, thereby resulting in arcing and contact creep in prior art constructions.

Figure 8 shows, on the other hand, the path of the armature 8 of the special relay constructed in accordance with the present invention, as a function of the time indicated in milliseconds for the same time period as that of Figures 5 and 7. The curve extending from the point $T_{AW}$ to $T_1$ corresponds to the time when the relay 8 is out of contact with the relay core 1. At the point $T_1$ begins the engagement of the contacts 6 and 7, whereby $T_1$ upon the curve corresponds to the normal position of the counter-contact spring 5 in which it is not tensioned by the contact spring 4. The point upon the ordinate designated as 0 and the location $T_{0w}$ upon the curve represent the so-called zero position of the swinging system constituted in Figures 1 to 3 by the members 4, 5 and 8, wherein when the relay winding 3 has no current, the contact spring 4 engages with tension the counterspring 5.

A comparison of the diagram of Figure 8 with the prior art diagram shown in Figure 7 shows that according to the present invention the path of the armature 8 extending from the point $T_1$ over the point of its greatest deviation $T_U$ to the point $T_2$ in which the contacts 6 and 7 are separated, is a free and substantially harmonic oscillation which is not impeded by any stop. By way of comparison, Figure 8 shows by broken lines a theoretical curve of oscillations beginning at the return point $T_U$, which would be produced as the result of natural frequency characteristics of the swinging system when in the time period ($t_b$) no magnetic force of attraction would be exerted upon the armature. For the sake of better illustration, the conditions have been shown somewhat exaggeratedly in Figure 8, so that there is a substantial difference between the point of intersection of the actual swinging with the line representing the normal position, and the point of intersection of the free oscillation designated by a broken line with this same line of normal position, said difference amounting to about 8 milliseconds. However, in a preferred practical embodiment of the invention, this difference amounts to only 1 millisecond. Consequently, according to this inventive embodiment, the duration of one-half of the natural frequency of the swinging system consisting of the elements 4, 5 and 8, and the time period ($t_b$) during which the contacts are in engagement, are equal for all practical purposes.

In Figure 8 one-half of the natural frequency duration of the swinging system is designated as $t_f$ and extends from the point $T0W$ to the point $T0R_f$.

The return movement of the contact spring 4, which begins at the point TU of the outer end position thereof, continues up to the point $T_2$ of the separation of the contacts under the accelerating influence of the stored spring force, and takes place solely in the direction of the magnetic force which attracts the armature. Thus at the point $T_2$ at which the contacts are separated, the spring 4 with the contact 7 has already a substantial speed exerted for the opening of the contacts. This represents a substantial advantage of the present invention as compared to the conditions prevailing in the prior art round relay wherein, as indicated in Figure 7, the spring carrying the contact has substantially the velocity zero at the time moment $T_2$.

From the point $T_2$ on the speed with which the contacts are separated from each other is further increased by the fact that the magnetic force has already become quite great, as indicated in Figure 5, as well as primarily by the fact that the distance of the armature from the relay core is becoming smaller and smaller. Consequently, as shown in Figure 8, the armature from the point $T_2$ moves aperiodically and is accelerated up to the point TAR in which the armature strikes the iron core of the relay.

All of the Figures 5 to 8 show mechanical and magnetic proceedings only for the time period continuing from the point TAW at which the armature drops away from the core of the relay, to the point TAR of Figure 8 at which time the armature again strikes the core. These figures do not illustrate the electrical, mechanical and magnetic procedures during the major portions of the comparatively long time period continuing for approximately one second, during which the armature rests upon the relay core and no impulse is transmitted to the fence. The total time period amounting to approximately one second, takes place between a point TAR (Fig. 8) and the following point TAR which is not illustrated. A complete cycle of the movement of the armature is thus composed of a substantially harmonical movement from the point TAW to the point $T_2$ which continues for a comparatively short time, an aperiodic, non-harmonic movement from the point $T_2$ to the point TAR which also is of very short duration, and a period of rest which continues for a long time period. This non-uniform composition of the cycle represents a substantial and most important difference between the movements of the armature of the special relay constructed in accordance with the present invention, and known cycle procedures in existing instruments, such as interrupters, so-called choppers and point inductors, wherein a magnetically influenced armature swings substantially harmonically during the entire cycle of its movement.

In the practical construction of the special relay of the present invention, it is advantageous to so select the mass of the armature 8 that its kinetic energy at the moment $T_2$ of the opening of the contacts is quite great in comparison to the work exerted by it for the opening of the contacts 6 and 7, so that this high speed will be preserved for all practical purposes and will be even increased.

This great speed which takes place at the time of the separation of the contacts according to the present invention is of utmost importance for the purpose of avoiding contact migration which would otherwise occur for the following reasons:

When the rest contact of the relay is open, the contact voltage increases due to the inductance of the primary winding of the transformer, which was suddenly switched in, in the form of a sinus-shaped alternating current from zero to a maximum of 100 volts and even more. This can produce arcing which will lead to contact migration. Another reason therefor is that the microscopic local contact points are very strongly heated so that parts of the contacts may melt. However, in accordance with the relay of the present invention the speed with which the contacts open is so great, that no arcing can take place and the heated contact points have no time to migrate to the other contact. In this connection practical experience has shown that contacts of the present invention may be advantageously made from a gold-nickel alloy, or a material having similar contact properties, namely, having a lesser melting point than the contacts normally employed for alternating rectifiers. It is then possible, as is a prerequisite for the highly sensitive relay of an electrical fence equipment, to operate with comparatively low contact pressures in comparison to the contact pressures prevailing in alternating rectifiers and the like. Such pressures will not equalize the contact points but are generally sufficient, since contact migration is avoided in the described manner by the high speed of the separation of the contacts.

As far as prior art relays are concerned, such as the ones which were used heretofore for electrical fence equipment and which correspond to the diagram shown in Figure 7, when such relays are treated roughly, or are subjected to shocks, which is easily possible under the conditions in which they operate, undesired changes in the adjustment of contact springs relatively to the relay core can easily take place. In most cases this results in an excessive battery consumption. On the other hand, in accordance with the special relay of the present invention, the contact engagement period is to a large extent independent of the adjustment due to the oscillation characteristics of the oscillating system, so that it changes only to a very small extent in the case of an undesired change of adjustment.

Figure 9 illustrates an additional embodiment, wherein the spring 4 of Figure 1 has been replaced by a spring 4a which also carries the armature 8. However, in accordance with this construction the contact 7 is not mounted directly upon the contact spring 4a, but is carried upon a counterspring 5a, the resilient action of which corresponds to that of counterspring 5 in Figure 1. However, in accordance with the construction shown in Figure 9, the counterspring 5a is not mounted independently in the insulating blocks 9 and 10, but has the form of a short spring, the inner end of which is firmly connected with the contact spring 4a at the point 10a, which is located at a distance from the supports 9 and 10 carrying the spring 4a. Thus the springs 4a and 5a swing jointly in the region between the support 10 and the connecting point 10a.

In accordance with this construction the second contact 6 is not connected with a counterspring but is firmly fixed in a block or support 5b which is firmly attached to the frame of the relay (not shown). The contact 6 is conductively connected with a terminal 5'. A conduit (not shown) which is connected to the terminal 5' extends to the condenser 17 and the relay 13 in the manner shown in Figure 3. The spring 4a has an extension 4' which is connected with the primary winding 12 of the high frequency transformer in the manner which is also shown in Figure 3.

It is apparent that the construction shown in Figure 9 differs from that shown in Figure 1 as far as the movement at the contacts 6 and 7 is concerned, in that it takes place not precisely with the same speed as the speed of movement of the armature 8, but takes place with a speed which is proportional to the speed of the armature, since the contacts 6 and 7 are not located directly over the middle of the armature 8, but to one side thereof. This increases to a small extent the speed with which the contacts 6 and 7 are separated, which is in general desirable. When considered as an elastical resilient element, the spring 5a operates in precisely the same manner as the spring 5 shown in Figure 1.

A somewhat different embodiment is illustrated in Figure 10, wherein the above indicated advantage of an increased speed during the separation of the contacts is furthered by the following structural changes:

According to the construction of Figure 10, the contact spring 4c does not carry a contact at its free end, but is firmly connected at that end which is located opposite the armature 8, with a counterspring 5c constituting a continuation of the contact spring 4c. As in the construction of Figure 9 in this construction as well the counterspring carries the contact 7, while the other contact 6 is firmly connected to a support 5b which is attached to the frame of the relay. The terminal 5' and the projecting end 4' are connected with wires in the same manner as the same parts in the construction of Figure 9. The area of contact between the springs 4c and 5c is indicated at 10c in the construction of Figure 10.

It is apparent that the spring 4c will carry out a swinging movement by the attraction of the armature and the opposed force of the spring in the manner described in connection with the devices shown in Figures 1, 2 and 3. However, in this construction the contact 7 moves over a longer path than the connecting area 10c of the spring 5c, since in previously described constructions the contact 7 was located at that area. Consequently, at the end of the engagement of the contacts, the separation of the contacts 6 and 7 takes place at a higher speed than that prevailing in the constructions shown in Figures 1, 2 and 3, which is particularly desirable for the purposes of the present invention.

It is apparent that the examples shown above have been given solely by way of illustration and not by way of limitation, and they are subject to many variations and modifications within the scope of the present invention. All such variations and modifications are to be included within the scope of the present invention.

This application is a continuation in part of my patent application Serial No. 608,103, filed September 5, 1956, now Patent No. 2,866,107.

What is claimed is:

1. Electrical equipment for applying electrical impulses of a predetermined voltage to a fence at regular time intervals, said equipment comprising a source of direct current, a high voltage transformer having a primary winding connected with said source and a secondary winding connected to the fence, a condenser connected to said source, and a control relay comprising two normally closed cooperating contacts, one of said contacts being connected with said primary winding, the other one of said contacts being connected with said condenser, a core of magnetic material, at least one relay winding cooperating with said core and further connected with said source, said other contact and said condenser, an armature located in the magnetic field of said core, a spring assembly comprising at least two springs, a fixed mounting spaced from said armature and supporting said springs, one of said springs being a leaf spring and carrying said armature, said leaf spring being resiliently swingable in relation to said mounting and when at rest with the relay deenergized being located in an intermediate position with the armature spaced from said core, the other one of said springs carrying one of said contacts and being resiliently swingable in association with said leaf spring to and from a normal position in which said contacts are closed and said leaf spring is in said intermediate position, means supporting the other one of said contacts in a position in which it engages the first-mentioned contact when said leaf spring is in said intermediate position, whereby said armature is attracted by said core to separate said contacts when the relay winding is energized by the charging current of said condenser and thereupon swings away from said core to cause said contacts to close during a predetermined time period and to produce a discharging current of the condenser in said primary winding, whereupon the operation is repeated, said armature and said spring assembly being of such resiliency and weight that the duration of the swinging of said other spring is so related to the time period during which the contacts are closed that the armature swings without stop to the position of outermost deflection from said core and immediately thereafter back only in the direction of the attraction to the core and after the separation of the contacts aperiodically and with acceleration, and that only after separation of the contacts one of said electrical impulses is produced by induction of a field in said secondary winding at the end of said time period near said intermediate position of said leaf spring.

2. Electrical fencing equipment in accordance with claim 1, wherein a portion of said leaf spring, which is located close to said mounting, carries said other spring at a distance from said mounting and said armature, and wherein the contact carried by said other spring is spaced from said intermediate position of the leaf spring and from said mounting, the distance of the last-mentioned contact from said mounting being greater than the distance of said armature from said mounting.

3. Electrical fencing equipment of the kind in which electrical impulses of a predetermined voltage are applied to a fence at regular time intervals in the order of one second, said equipment comprising a condenser, a source of direct current connected with said condenser for charging said condenser, a high voltage transformer comprising a primary winding having one end connected with said source and another end connected with said condenser, and a secondary winding having one end connected to the fence, and a control relay having a core of magnetic material and comprising two normally closed cooperating contacts, one of said contacts being connected with the primary winding of said transformer and the other contact being connected with said condenser, an armature, a spring assembly comprising means carrying and operating said contacts and a leaf spring carrying said armature, said spring being located in a normal intermediate position when the relay is deenergized; said armature being located in the magnetic field of said core, at least one relay winding cooperating with said core and having one end connected with said source and another end connected with said condenser and said contacts, whereby said armature is attracted by said core to move said spring carrying said armature away from said normal intermediate position when the relay winding is energized by the charging current of said condenser, and whereby said spring is kept away from said normal position and said contacts are kept separated during said regular time interval as long as said charging current continues, and whereby said spring and its armature are then released from said core; said spring assembly being swingable in its entirety away from said core and from said normal position to a point of reversion and back without stop to said normal position and so as to close said contacts during said one forward and backward swing and during a predetermined relatively short contact closing time interval, each of which short time intervals beginning at a time when the assembly is substantially in said normal position and ending at another time when the assembly is again close to said normal position, whereby said primary winding of the transformer is energized for said short time interval through said contacts by the discharging of said condenser and whereby simultaneously a charging current of said condenser flowing from said source through said relay winding is generated which again produces a field re-attracting said armature and separating said contacts when said primary winding has been energized by said discharging current to a substantial degree, thus producing one of said electrical impulses in said secondary winding; said spring assembly together with said armature having resilient, natural frequency and mass characteristics so predetermined as to give said backward swinging until the second-mentioned time and past said normal position only the same phase and direction as those of the magnetic force of said last-mentioned field re-attracting said armature, whereby said backward swinging accelerates said contact separating effect of said magnetic force, the induction field produced by said discharging current of said condenser producing said electrical impulse when disappearing after the separation of the contacts.

4. An electrical fencing equipment in accordance with claim 3, wherein said high voltage transformer is a core of magnetic material constituting a single integral unit with the core of the relay.

5. Electrical fencing equipment in accordance with claim 3, wherein said spring assembly comprises a pair of contact leaf springs respectively carrying the cooperating contacts, a third leaf spring carrying the armature, and coupling means between such springs, whereby one of the contact springs and the third spring are caused to move together when the armature is attracted by the core.

6. Electrical fencing equipment in accordance with claim 3, wherein said leaf spring assembly comprises a spring carrying one of the cooperating contacts and a second leaf spring carrying both the other contact and the armature.

7. Electrical fencing equipment in accordance with claim 3, wherein said cooperating contacts consist of a gold-nickel alloy.

8. Electrical fencing equipment in accordance with claim 3, wherein the time period during which the two contacts are in engagement is substantially equal to one-half of the oscillation period of the swinging system.

9. A control relay for an electrical fencing equipment, said control relay comprising a core of magnetic material, a relay winding for magnetizing said core, an armature located in the magnetic field of said core and adapted to be attracted thereby, an elongated leaf spring having a fixed end and another end carrying said armature, a contact, another leaf spring having an end attached to the first-mentioned spring and another end carrying said contact, the second-mentioned spring extending parallel to the first-mentioned spring, said contact facing in the opposite direction from that of said armature, and another fixed contact engaging the first-mentioned contact in the normal position of the relay.

10. A control relay in accordance with claim 9, wherein the second-mentioned spring is attached to the first-mentioned spring intermediate the ends of the latter.

11. A control relay in accordance with claim 9, wherein the second-mentioned spring is attached to the armature-carrying end of the first-mentioned spring and extends beyond the latter.

12. A control relay in accordance with claim 9, wherein the first-mentioned contact is located at a greater distance from the fixed end of the first-mentioned spring than said armature.

No references cited.